United States Patent
Domries

[11] Patent Number: 5,944,116
[45] Date of Patent: Aug. 31, 1999

[54] APPARATUS FOR POSITIONING A WORK OBJECT

[76] Inventor: Bernard O. Domries, 12281 Rd. 29, Madera, Calif. 93638

[21] Appl. No.: 08/886,524

[22] Filed: Jul. 2, 1997

[51] Int. Cl.⁶ ..................................................... A01B 73/00
[52] U.S. Cl. .......................... 172/580; 172/637; 172/640; 172/662
[58] Field of Search ..................................... 172/580, 635, 172/637, 639, 634, 640, 662, 683; 244/102 R, 100 R

[56] References Cited

U.S. PATENT DOCUMENTS

| | | | |
|---|---|---|---|
| 4,308,920 | 1/1982 | Floyd et al. | 172/662 X |
| 4,408,736 | 10/1983 | Kirschbaum et al. | 244/100 R |
| 4,415,043 | 11/1983 | Hadler et al. | 172/662 X |
| 4,452,318 | 6/1984 | Boetto | 172/662 X |
| 4,720,063 | 1/1988 | James et al. | 244/102 R |
| 4,917,334 | 4/1990 | Ralph et al. | 244/102 R |

*Primary Examiner*—Christopher J. Novosad
*Attorney, Agent, or Firm*—Worrel & Worrel

[57] ABSTRACT

An apparatus for positioning a work object relative to a primary support between first and second positions, the apparatus having a first mount adapted to be mounted on the work object; a second mount adapted to be mounted on the primary support; a linking assembly interconnecting the first and second mounts; and a control system interconnecting the work object and the linking assembly for selectively applying force to the linking assembly to move the work object between the first and second positions.

21 Claims, 5 Drawing Sheets

APPARATUS FOR POSITIONING A WORK OBJECT

BACKGROUND OF THE INVENTION

1. Field of the Invention

The present invention relates to an apparatus for positioning a work object and, more particularly, to such an apparatus which is adaptable for use in a wide variety of specific embodiments for deploying a work object relative to a primary support with a proficiency not heretofore achieved in the art.

2. Description of the Prior Art

In a wide variety of mechanical arts there exists a need to position a work object relative to a primary support for a virtually limitless variety of specific purposes. The operative environments within which this capability must be available for use are so diverse that a few representative examples do little to demonstrate the universal nature of this need. Nonetheless, several specific examples will be mentioned for purposes of a more complete understanding of the scope and application of the apparatus of the present invention.

For example, in the case of aircraft design, it is necessary to provide the landing gear of the aircraft with the capability for retraction into enclosed housings for purposes of aerodynamics as well as the avoidance of damage during flight. It is, as a consequence, known to provide a wide variety of mechanisms capable of deploying the landing gear of the aircraft into operational positions wherein the landing gear is capable of performing its operational objectives without failure. However, when the aircraft is airborne, the landing gear must be moved into retracted positions enclosed within the wing or fuselage of the aircraft, usually within a compartment sealed from the exterior of the aircraft by landing gear doors. Because the complexity of the movements of the landing gear assembly must not only meet the operational objectives, but must be capable of retracting into confined areas, the mechanical assemblies required for this purpose present unique difficulties.

A host of other operational environments in which such operational objectives present particular difficulties include virtually all situations in which movement of one or more work objects relative to a primary means of support requires that such criteria as precision, confined working quarters, heavy weight or leverages and the like must be taken into account.

For purposes of illustrative convenience, the environment depicted herein relates to large agricultural implements. It is known that agricultural implements, particularly as must be employed in large scale farming operations, require that very heavy and bulky equipment be employed to perform their primary operational objectives in a very expansive fully deployed configuration. During such usage the implements must be operational as a single operational unit traversing the earth in very wide swaths of operation and with the application of tremendous forces. Notwithstanding the need fully to meet their primary operational objectives, such implements must be capable of meeting secondary operational objectives such as being readily disassembled, contracted or otherwise reconfigured to permit transport along roadways and more confined paths of travel and for purposes of storage.

In the case of agricultural implements and the like, a wide variety of mechanisms have been employed in an effort to achieve these secondary objectives without compromising the primary objectives. Depending upon the specific prior art mechanism employed, they have typically been cumbersome, time consuming to reconfigure, expensive and subject to a myriad of other deficiencies. In summary, these prior art efforts have been less than successful, in general, in that either the primary objectives were compromised or the secondary objectives were compromised, or both were compromised. In addition, the prior art devices have been characteristically deficient in their lack of precision in positioning the operative components; in their ability to handle the extreme weights and forces required; in the relatively fragile nature of their construction and the like.

Therefore, it has long been known that it would be desirable to have an apparatus for positioning a work object which is widely adaptable for usage in the multiplicity of operative environments within which these requirements exist; which is capable of achieving all of the primary and secondary operational objectives required in a particular operative environment in positioning a work object relative to a primary support; which is adaptable for use in very confined areas in achieving these operational objectives; which is fully adaptable to a wide variety of operative environments without compromising the criteria selected therefor; which has particular utility in use in very heavy machinery, such as agricultural implements, wherein tremendous weights and forces must be applied in achieving the primary operational objectives while retaining a full capability for reconfiguration for ease of transport and storage; and which is otherwise fully successful in achieving its operational objectives.

SUMMARY OF THE INVENTION

Therefore, it is an object of the present invention to provide an improved apparatus for positioning a work object.

Another object is to provide such an apparatus which is operable with an efficiency not heretofore achieved in the art in moving a work object relative to a primary support and which is fully adaptable to virtually all operative environments within which such an objective must be achieved within particular design criteria.

Another object is to provide such an apparatus which is particularly well suited to usage in operative environments in which the movement of the work object relative to the primary support must be achieved under such operative conditions as great weight, great force, within confined areas, and within tolerances, or with such precision as has not heretofore been achieved with conventional devices intended for the same broad purposes.

Another object is to provide such an apparatus which is unusually successful in usage on heavy machinery, such as agricultural implements, where great weights and physical forces are applied during normal operation, but which require that such apparatuses be reconfigured for transport and storage.

Another object is to provide such an apparatus wherein the force applied in moving the work object between first and second operational positions is achieved by the application of the force to accomplish this objective being substantially fully contained on the work object which is to be moved rather than on the primary support as is the case with conventional devices designed broadly for the same purposes.

Another object is to provide such an apparatus which possesses the capability for substantially finite adjustment to particular operative positions.

Another object is to provide such an apparatus which possesses the capability for providing adaptability to particular secondary operational objectives such as incorporating a desirable operational characteristic such as a flexibility of operation during performance of its primary operational objectives.

A further object is to provide improved elements and arrangements thereof in an apparatus for the purpose described which is dependable, economical, durable and fully effective in accomplishing its intended purposes.

These and other operational objectives are achieved, in the illustrative embodiment of the present invention, in an apparatus for positioning a work object relative to a primary support between first and second positions, the apparatus having a first mounting means adapted to be mounted on the work object; a second mounting means adapted to be mounted on the primary support; a linking assembly interconnecting the first and second mounting means; and means connected to the linking assembly for selectively applying force thereto to move the work object between the first and second positions.

DESCRIPTION OF THE PREFERRED EMBODIMENT

Figure 1:
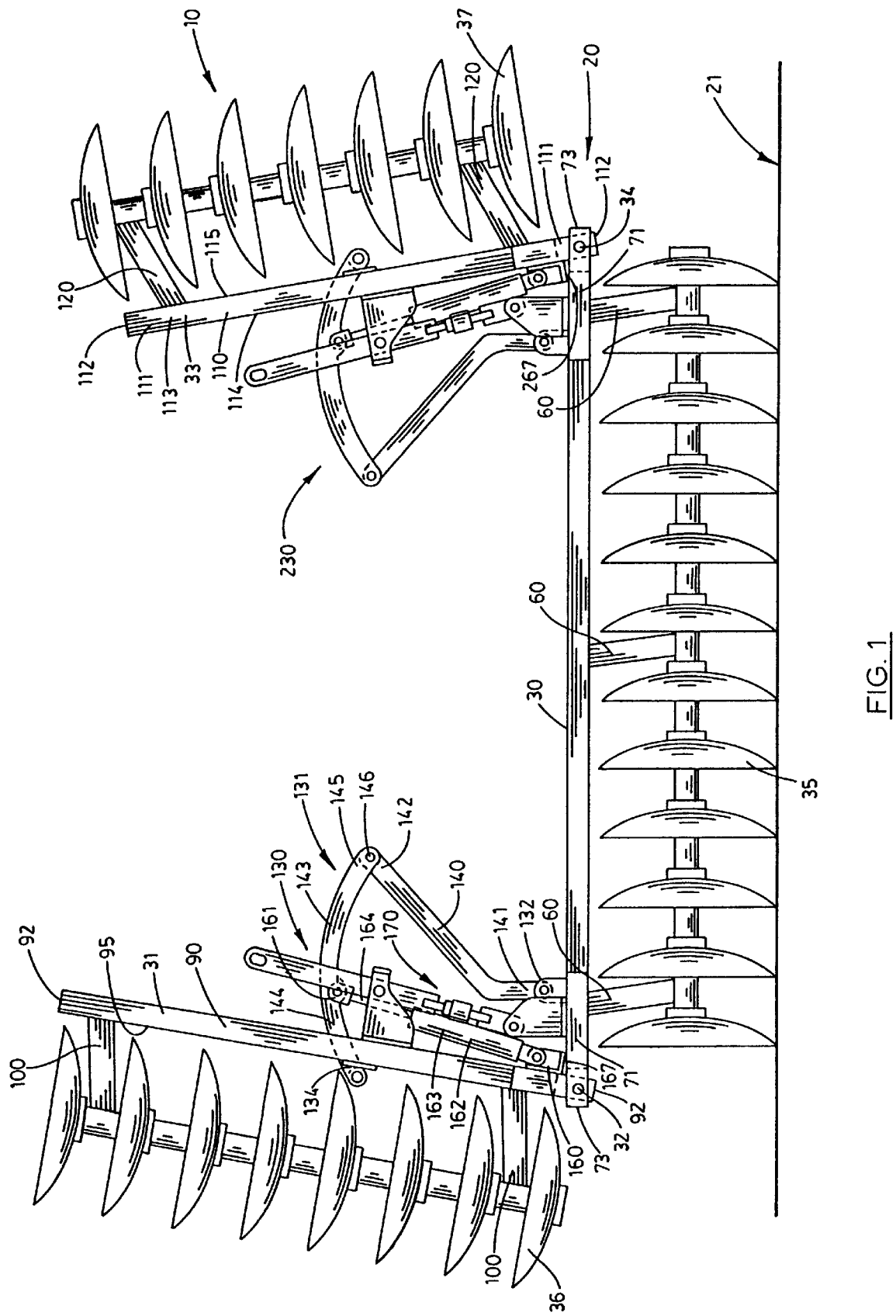
FIG. 1 is a rear elevation of the apparatus of the present invention in use on an agricultural implement and disposed in a contracted operational configuration with the subframes thereof elevated for transport and storage.

Referring more particularly to the drawings, the apparatus of the present invention is generally indicated by the numeral 10 in FIG. 1.

As heretofore discussed, the apparatus of the present invention has application to a wide variety of operative environments and virtually every environment within which a work object must be moved relative to a primary support. For purposes of illustrative convenience, the apparatus 10 is shown herein in its preferred embodiment in usage on an earth working implement 20. However, it will be understood that the apparatus 10 of the present invention is in no way limited to this particular operative environment and can be employed, for example, in industry, aerospace technologies, automotive technologies and a host of other disparate environments.

As shown in FIG. 1, the earth working implement 20 is solely for illustrative convenience depicted as a large disk harrow such as employed on large agricultural acreages. The implement is adapted to be drawn by a tractor, not shown, using any appropriate hitch or mounting assembly, not shown. The earth working implement is shown in FIG. 1 rested on the earth's surface 21.

The implement 20 can be viewed generally as having a central main frame 30 on which is mounted a left subframe 31 mounted on a left pivot assembly 32 for pivotal movement about a substantially horizontal axis. A right subframe 33 is mounted on the main frame on a right pivot assembly 34 for pivotal movement about a substantially horizontal axis. The main frame mounts a central earth working assembly 35. The left subframe mounts a left earth working assembly 36. The right subframe mounts a right earth working assembly 37. The central, left and right earth working assemblies 35, 36 and 37 are solely for illustrative convenience, depicted as disk assemblies.

Referring more particularly to the main frame 30, the main frame has three (3) main tubular beams 50 each having opposite end portions 51 which extend to terminal ends 52. Each of the main tubular beams has parallel opposite sides 53, an upper surface 54 and an opposite, parallel lower surface 55. The beams are mounted in spaced, parallel relation to each other defining slots or spaces 56 between adjacent main tubular beams. The two spaces 56 are of the same widths and lengths.

The central earth working assembly 35 has mounting arms 60 mounted, as by welding, on the lower surfaces 55 of the main tubular beams. A disk assembly 61 is mounted on the lower ends of the mounting arms and mounts a plurality of disks 62 which are rotational by ground engagement about a common axis of rotation 63.

Figure 3:
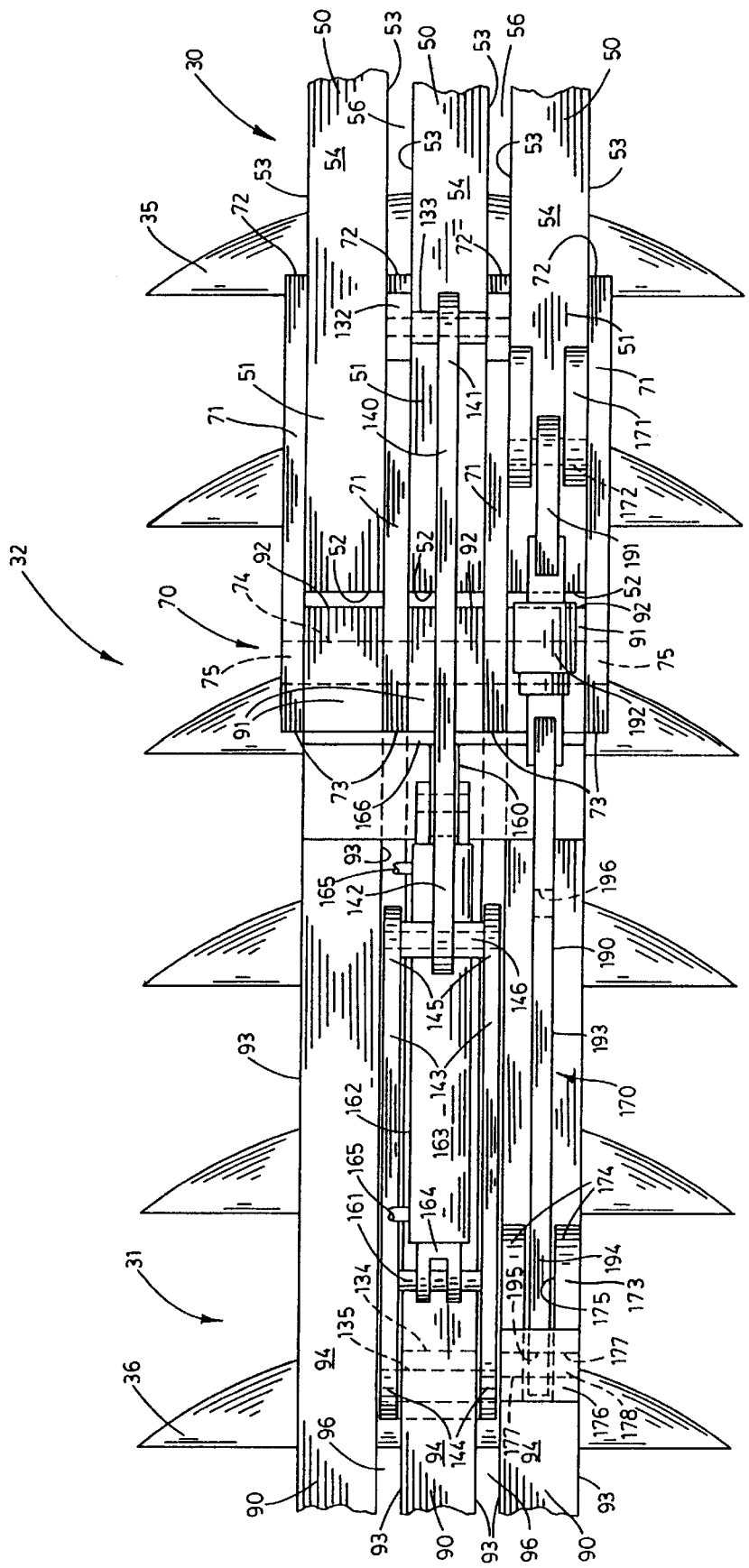
FIG. 3 is a somewhat enlarged, fragmentary, top plan view taken on line 3—3 in FIG. 2.

The left pivot assembly 32 and right pivot assembly 34 of the main frame 30 can each, more specifically, be identified, as shown best in FIG. 3, as a pivot assembly 70. Each pivot assembly 70 has four (4) mounting plates 71 mounted, as by welding, on the opposite sides 53 of the opposite end portions 51 of the main tubular beams 50 of the main frame. Thus, as shown in FIG. 3, two (2) of the mounting plates 71 are mounted on each of the outer opposite sides of the main tubular beams 50. Similarly, two (2) mounting plates 71 are individually mounted within the spaces 56 defined by the main tubular beams 50. The mounting plates have corresponding interior ends 72 and opposite, corresponding exterior ends 73. The exterior ends 73 of the mounting plate 71 define a plane right-angularly related to the longitudinal axes of the main tubular beams 50 and spaced from the terminal ends 52 of the main tubular beams. A pivot pin or rod 74 extends through the mounting plates 71 in predetermined spaced relation to the terminal ends 52 of the main tubular beams. The pivot rod has opposite ends 75.

The left subframe 31 has three (3) main tubular beams 90 mounted in equally spaced, parallel relation, as best shown in FIG. 3. The main tubular beams 90 have corresponding opposite end portions 91 extending to terminal ends 92. The terminal ends 92 of the main tubular beams are disposed in spaced, substantially parallel relation to the terminal ends 52 of the main tubular beams 50 of the main frame 30. The main tubular beams 90 have corresponding, substantially parallel opposite sides 93, corresponding upper surfaces 94 and corresponding lower surfaces 95. Adjacent main tubular beams define slots or spaces 96 therebetween, as best shown in FIG. 3. The opposite end portions 91 of the main tubular beams 90 are individually mounted for pivotal movement on the pivot rod 74 of the pivot assembly 70 so that the corresponding end portions 91 of the main tubular beams nearest the end portions 51 of the main tubular beams 50 of the main frame 30 are individually received between mounting plates 71 of pivot assembly, as shown in FIG. 3. The left subframe 31 is thus pivotal about a horizontal axis defined by the pivot rod 74 between the position shown on the left in FIG. 2 and the position shown on the left in FIG. 1.

The left earth working assembly 36 has a pair of mounting arms 100 on which a disk assembly 101 is mounted in the conventional manner. The disk assembly has a plurality of disks 102 mounted thereon in spaced relation to each other for rotation about an axis of rotation 103 which, in the operational position shown in FIG. 2, is coaxial with the axis of rotation 63 of the disk assembly 61 of the central earth working assembly 35.

The right subframe 33 has three (3) main tubular beams 110, as shown best in FIGS. 1, 2, 4 and 5. The main tubular beams 110 have corresponding opposite end portions 111 extending to corresponding terminal ends 112. The terminal ends 112 on the right of the main tubular beams 110 define a plane substantially parallel to and in predetermined spaced relation to the plane defined by the terminal ends 52 of the main tubular beams of the main frame 30. Each of the main tubular beams 110 has parallel opposite sides 113, an upper surface 114 and a lower surface 115 parallel to the upper surface 114. Adjacent main tubular beams define slots or spaces 116 of the same widths and lengths and corresponding to the same widths as the spaces 56 of the main frame 30. The opposite end portions 111 of the main tubular beams 110 are individually mounted for pivotal movement on the pivot rod 74 of their respective pivot assembly 70 so that the corresponding end portions 111 of the main tubular beams 110 nearest the end portions 51 of the main tubular beams 50 of the main frame 30 are individually received between mounting plates 71 of the pivot assembly 70. The right subframe 33 is pivoted about a horizontal axis defined by the pivot rod 74 between the position shown on the right in FIG. 2 and the position shown on the right in FIG. 1.

The right earth working assembly 37 of the right subframe 33 includes a pair of mounting arms 120 which are individually mounted on the main tubular beams 110 of the right subframe 33, as by welding, and extend downwardly therefrom to mount a disk assembly 121 at the lower ends thereof. The disk assembly 121 includes a plurality of disks 122 mounted thereon in spaced relation to each other for rotational movement upon ground engagement about a common axis of rotation 123. When the implement 20 is in its operational configuration as shown in FIG. 2, the axes of rotation 63, 103 and 123 are in substantial axial alignment, as shown in FIG. 2.

Figure 2:
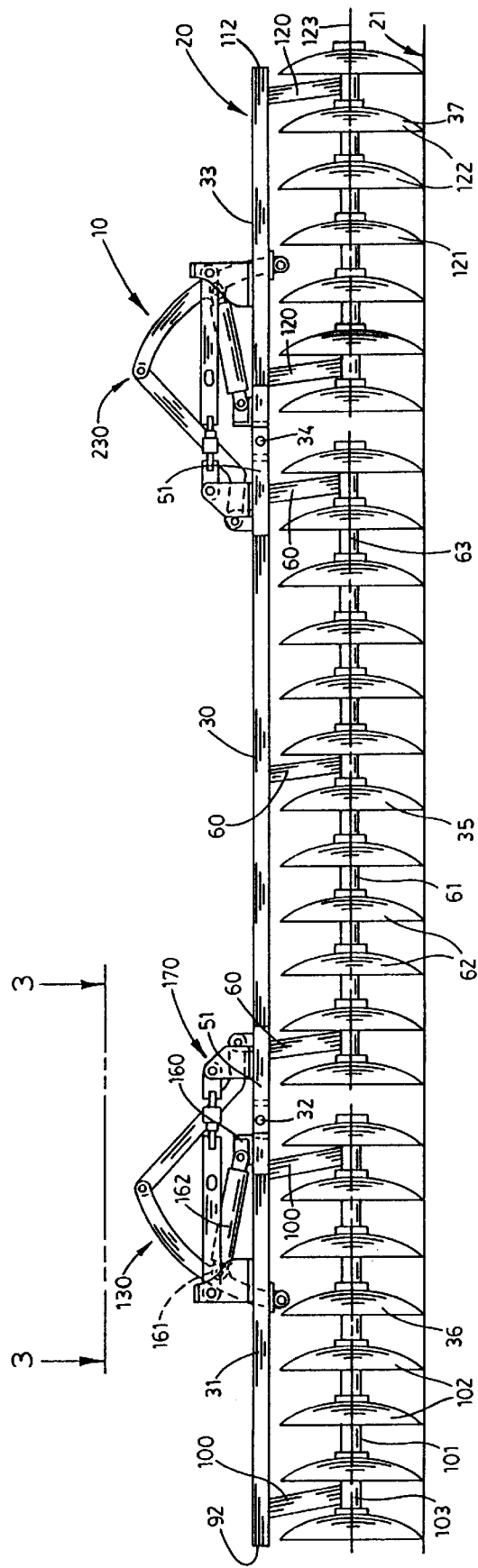
FIG. 2 is a rear elevation of the agricultural implement of FIG. 1 disposed in an operational configuration with the subframes thereof deployed in operational positions.

The left subframe 31 mounts a left positioning assembly generally indicated by the numeral 130 in FIG. 2. The left positioning assembly 130 is best shown in FIGS. 1, 2 and 3. As shown therein, the left positioning assembly has a linkage assembly generally indicated by the numeral 131. The linkage assembly 131 includes a main frame pivot mount 132 mounted on the corresponding end portions 51 of the main tubular beams 50 on the left, as shown in FIGS. 1 and 2 and as shown in top plan view in FIG. 3. The main frame pivot mount 132 mounts a bearing assembly 133 defining an axis of rotation right-angularly related to the longitudinal axes of the main tubular beams 50. The linkage assembly 131 additionally includes a left subframe pivot mount 134 shown on the left, as viewed in FIG. 3 and mounting a bearing assembly 135 defining an axis of rotation right-angularly related to the longitudinal axes of the main tubular beams 90 of the left subframe 31.

The linkage assembly 131 further includes a first link arm 140 mounted on the bearing assembly 133 of the main frame pivot mount 132 for pivotal movement about the axis defined by the bearing assembly 133 between the position shown in FIG. 2 and the position shown in FIG. 1. The first link arm has a proximal end portion 141 which is mounted on the bearing assembly 133 and an opposite distal end portion 142. The linkage assembly 131 further includes a pair of second link arms 143 having corresponding proximal end portions 144 and opposite distal end portions 145. The proximal end portions 144 of the second link arms 143 are mounted for pivotal movement on the bearing assembly 135 for movement between the position shown in FIG. 2 and the position shown in FIG. 1 relative to the main frame 30 and the left frame 33. The distal end portion 142 of the first link arm 140 and the distal end portions 145 of the second link arms 143 are pivotally interconnected by a pivot assembly 146.

The left positioning assembly 130 further includes an hydraulic cylinder mount 160 which is mounted on the central main tubular beam 90 of the left subframe 31 adjacent to the pivot assembly 70, as shown in FIG. 3. An hydraulic cylinder mount 161 is mounted on the second link arms 143 extending therebetween, as best shown in FIG. 3. An hydraulic cylinder assembly 162 is mounted on and interconnects the hydraulic cylinder mounts 160 and 161. The hydraulic cylinder assembly includes an hydraulic cylinder 163 which is, in the preferred embodiment, mounted on the hydraulic cylinder mount 160 and which houses a piston, not shown, and an hydraulic cylinder rod 164 extended therefrom and mounted at its terminal end on the hydraulic cylinder mount 161. It will be understood that the hydraulic cylinder assembly 162 is connected to a suitable hydraulic system operable to pressurize and depressurize the hydraulic cylinder assembly for purposes of moving the hydraulic cylinder rod 164 into, and from, the hydraulic cylinder in the conventional manner. Hydraulic cylinder hoses 165 are operably connected to the hydraulic cylinder 163 for this purpose.

The hydraulic cylinder mount 160 has an angle iron stop plate 166 having an upper edge 167. The upper edge is engageable with the main frame 30 in the elevated position shown in FIG. 1 to operate as an absolute stop to further clockwise movement of the left subframe as shown therein.

The left subframe positioning assembly 130 further includes an auxiliary support assembly 170. As best shown in FIG. 3, the auxiliary support assembly 170 has an inner bearing assembly 171 having a bearing pin 172 mounted therein and extending so as to define a pivot axis right-angularly related to the longitudinal axes of the main tubular beams 50. The auxiliary support assembly further includes an outer connection assembly 173 mounted on the upper surface 94 of the main tubular beam 90 nearest the lower edge of FIG. 3. The outer connection assembly includes a pair of upstanding plates 174 disposed in spaced, substantially parallel relation to define a slot 175 therebetween. A cover plate 176 is mounted on the upper ends of the upstanding plates above the slot 175. A pair of pin passages 177 extend individually through the upstanding plates to define an axis right-angularly related to the longitudinal axes of the main tubular beams 90. A linking pin 178 is dimensioned for slidable receipt within the pin passages 177 and is capable of being removed from the pin passages, as will hereinafter be described in greater detail.

A support arm assembly 190 operably interconnects the inner bearing assembly 171 and the outer connection assembly 173. The support arm assembly 190 includes an inner link 191 which is pivotally mounted on the bearing pin 172. A turnbuckle assembly 192 is mounted on the distal end of the inner link 191. An outer link 193 is mounted on the turnbuckle assembly 192 opposite the inner link 191, as best shown in FIG. 3. The outer link has a distal end portion 194 through which is extended an outer pin passage 195 dimensioned to receive the linking pin 178. An inner pin passage 196 is extended through the outer link 193 between the turnbuckle assembly and the outer pin passage 195. The inner pin passage is also dimensioned to receive the linking pin 178. In the preferred embodiment the outer pin passage and the inner pin passage are elongated slots extending relatively short distances along the longitudinal axis of the outer link 193 for purposes subsequently to be described.

Figure 4:
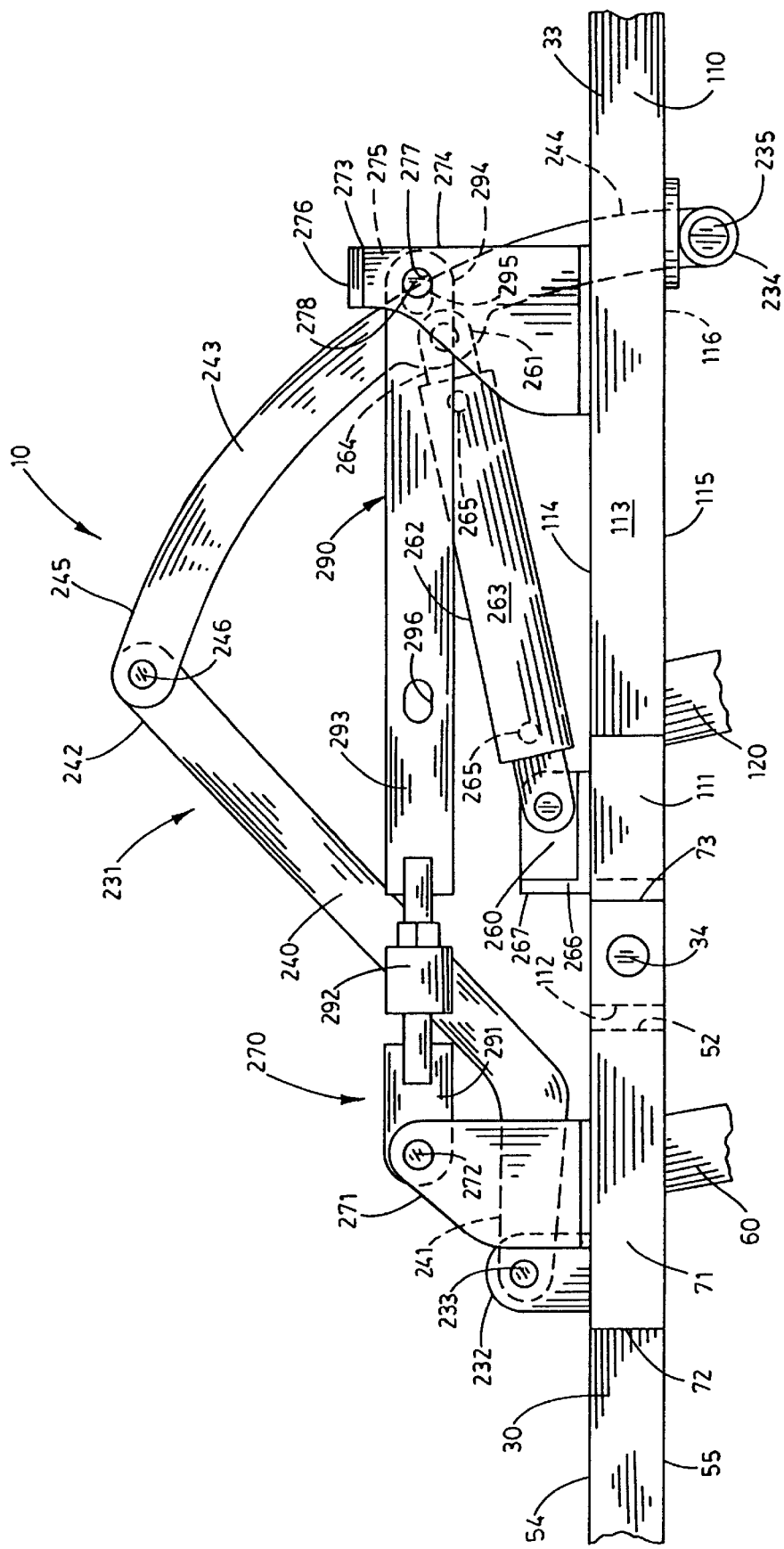
FIG. 4 is a somewhat enlarged, fragmentary, elevational view of the apparatus of the present invention disposed in the configuration as shown on the right in FIG. 2.
Figure 5:
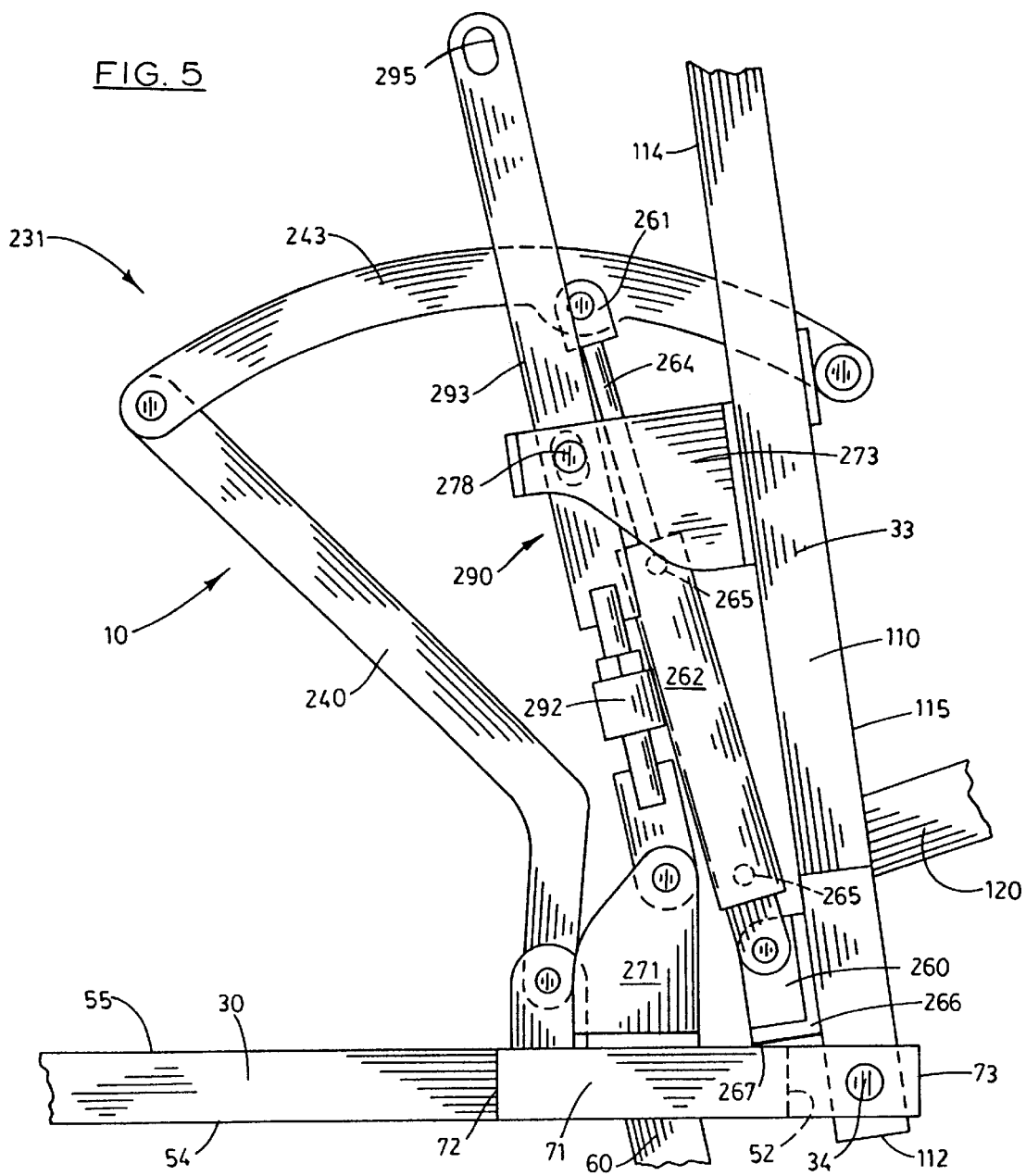
FIG. 5 is a somewhat enlarged, fragmentary, elevational view of the apparatus of the present invention shown in FIG. 4, but deployed in a second operative configuration as shown on the right in FIG. 1.

The right subframe 33 has a right positioning assembly generally indicated by the numeral 230 in FIG. 2 and shown as well in FIGS. 1, 4 and 5. The right positioning assembly includes a linkage assembly 231, perhaps best shown in FIGS. 4 and 5. The right positioning assembly is essentially a mirror image of the left positioning assembly 130, as can best be visualized in FIGS. 1 and 2. The linkage assembly 231 has a main frame pivot mount 232 which is mounted in upstanding relation on the corresponding opposite end portions 51 of the main tubular beams 50 of the main frame 30. A bearing assembly 233 is mounted on the main frame pivot mount 232 and defines an axis of rotation extending transversely of the longitudinal axes of the main tubular beams 50. A right subframe pivot mount 234 is mounted on corresponding opposite end portions 111 of the main tubular beams 110 of the right subframe 33, as shown best in FIGS. 4 and 5. A bearing assembly 235 is mounted on the right subframe pivot mount 234 defining an axis of rotation right-angularly related to the longitudinal axes of the main tubular beams 110.

The linkage assembly 231 has a first link arm 240 having a proximal end portion 241 and an opposite distal end portion 242. The proximal end portion 241 of the first link arm is mounted for pivotal movement on the bearing assembly 233 of the main frame pivot mount. A pair of second link arms 243, having proximal end portions 244 and distal end portions 245, are mounted on the bearing assembly 235 of the right subframe pivot mount 234 for pivotal movement thereabout. The distal end portion 242 of the first link arm and the distal end portions 245 of the second link arms are pivotally interconnected by a pivot assembly 246.

An hydraulic cylinder mount 260 is mounted on the central one of the three main tubular beams 110 of the right subframe 33 adjacent to the right pivot assembly 34, as best shown in FIGS. 4 and 5. An hydraulic cylinder mount 261 is mounted on, and extends between, the second link arms 243 in spaced relation to the right subframe pivot mount 234, as best shown in FIGS. 4 and 5. An hydraulic cylinder assembly 262 is mounted on, and interconnects, the hydraulic cylinder mounts 260 and 261. The hydraulic cylinder assembly includes an hydraulic cylinder 263 which is, itself, mounted on the hydraulic cylinder mount 260 and contains a piston, not shown, to which an hydraulic cylinder rod 264 is mounted in the conventional manner and is movable therewith. The hydraulic cylinder rod 264 is mounted on the hydraulic cylinder mount 261. It will be understood that the hydraulic cylinder assembly 262 is connected to a suitable hydraulic system operable to extend and, alternatively, contract the hydraulic cylinder rod 264 thereby moving the second link arms 243 relative to the right subframe 33 between the positions shown in FIGS. 4 and 5. Hydraulic hoses 265 are operably connected to the hydraulic cylinder 263 for this purpose.

The hydraulic cylinder mount 260 has an angle iron stop plate 266 having an upper edge 267. The upper edge is engageable with the main frame 30 in the elevated position shown in FIG. 1 to operate as an absolute stop to further counterclockwise movement of the right subframe as shown therein.

An auxiliary support assembly 270 is mounted on, and interconnects, the main frame 30 and the right subframe 33. The auxiliary support assembly includes an inner bearing assembly 271 which is mounted on the opposite end portion 51 of the main tubular beam 50 which mounts the mounting plate 71 visible in FIGS. 4 and 5. A bearing pin 272 is mounted in the bearing assembly defining an axis of rotation right-angularly related to the longitudinal axes of the main tubular beams 50. An outer connection assembly 273 is mounted on the upper surface 114 of the main tubular beam 110 in alignment with the inner bearing assembly 271. The outer connection assembly includes a pair of spaced, substantially parallel upstanding plates 274 which are mounted on the upper surface 114 and define a slot 275 therebetween. A cover plate 276 is mounted on the distal ends of the upstanding plates. A pair of pin passages 277 individually extend through the upstanding plates aligned to define an axis right-angularly related to the longitudinal axes of the main tubular beams 110. A linking pin 278 is releasibly slidably received within the pin passages 277.

A support assembly 290 is adapted to interconnect the inner bearing assembly 271 and the outer connection assembly 273. The support arm assembly includes an inner link 291 pivotally mounted on the bearing pin 272 and, in turn, mounting a turnbuckle assembly 292. An outer link 293 is mounted on the turnbuckle assembly 292 and extends to a distal end portion 294 slidably received in the slot 275 between the upstanding plates 274. An outer pin passage 295 extends through the distal end portion 294 of the outer link 293 and is dimensioned to permit slidable receipt of the linking pin 278 through the pin passages 277 and the outer pin passage 295. An inner pin passage 296 extends through the outer link 293 in the position shown in FIG. 4 and is adapted to receive the linking pin 278 therethrough, as well as through the pin passages 277 when the right subframe positioning assembly 230 is in the configuration shown in FIG. 5, as will hereinafter be discussed in greater detail. In the preferred embodiment the outer pin passage 295 and the inner pin passage 296 are elongated slots extending relatively short distances along the longitudinal axis of the outer link for purposes subsequently to be described.

OPERATION

The operation of the described embodiment of the subject invention is believed to be clearly apparent and is briefly summarized at this point.

In the illustrative environment, as previously described, the earth working implement 20 is transported and stored in the configuration shown in FIG. 1 and used in the performance of its intended earth working functions as deployed and as shown in FIG. 2. The left positioning assembly 130 and the right positioning assembly 230 are employed to position the left subframe 31 and the right subframe 33 in the desired relative positions for the specific configuration desired. In the illustrative environment, the earth working implement 20 is connected to, and operated from, a tractor, not shown. As previously noted, the tractor has a suitable hitch and/or support assembly operable to draw the earth working implement 20 in trailing relation thereto, to position the earth working implement at the desired elevation relative to the earth's surface 21 and otherwise to operate the earth working implement in the manner required for the specific task to be preformed. For this purpose, the hydraulic cylinder assembly 162 and the hydraulic cylinder assembly 262 are connected through the hydraulic system hoses to the pressurized hydraulic system of the tractor upon which the earth working implement is mounted. In the conventional manner, the hydraulic system is operated to pressurize the hydraulic cylinder assemblies 162 and 262 in the manner and for the purpose of operating the left positioning assembly 130 and right positioning assembly 230, as hereinafter described.

Referring more particularly to FIG. 1, for purposes of illustrative convenience, it will be assumed at this point that the earth working implement 20 is in the configuration shown in FIG. 1 having been in storage and is being transported by a tractor, not shown, to a field for usage. With the subframes 31 and 33 in the fully raised positions as shown in FIG. 1, the earth working implement is of a width suitable for transport along roadways and through otherwise relatively confined areas making it convenient to transport the implement to the locale in which it is to be used.

Upon reaching the location at which the earth working implement 20 is to be employed, in the sequence preferred by the operator, the earth working implement 20 is lowered into engagement with the earth's surface 21 to the desired level. The left subframe 31 and right subframe 33 are pivoted from the positions shown in FIG. 1 to the fully operational positions shown in FIG. 2. Movement of the left and right subframes 31 and 33, respectively, to the operational positions shown in FIG. 2, requires that the linking pins 178 and 278 be removed from the respective auxiliary support assemblies 170 and 270 so as to free the outer links 193 and 293 for slidable movement within the respective outer connection assemblies 173 and 273.

Subsequently, the hydraulic pressure system of the tractor, not shown, is pressurized to cause the hydraulic cylinder rods 164 and 264 to be withdrawn into their respective hydraulic cylinders 163 and 263 and from the positions shown in FIG. 1 and moved to the positions shown in FIG. 2. This causes the second link arms 143 and 243 to be pivoted about their respective pivot mounts 134 and 234 toward their respective left pivot assembly 32 and right pivot assembly 34. Simultaneously, this force is applied to the first link arms 140 and 240 which cannot accommodate such movement thereby forcing the respective left and right subframes 31 and 33, respectively, to be pivoted outwardly and downwardly from the positions shown in FIG. 1 to the positions shown in FIG. 2. In other words, as shown in FIG. 1, the left subframe 31 is pivoted in a counterclockwise direction, as shown therein, while the right subframe 33 is pivoted in a clockwise direction, as shown therein. Such contraction of the hydraulic cylinder assemblies 162 and 262 is continued until the left subframe 31 and right subframe 33 have reached the positions shown in FIG. 2. This positions the axis of rotation 103 of the left earth working assembly 36 in substantial axial alignment with the axis of rotation 63 of the central earth working assembly 35. Similarly, the axis of rotation 123 of the right earth working assembly 37 is positioned in substantial alignment with the axis of rotation 63 of the central earth working assembly 35.

In order to reenforce positioning of the left subframe 31 and right subframe 33 in their respective operational positions, the linking pins 178 and 278 are individually inserted respectively through the pin passages 177 of the outer connection assembly 173, and the outer pin passage 195 thereof and the pin passages 277 of the outer connection assembly 273 and the outer pin passage 295. The left subframe 31 and right subframe 33 are thus essentially locked into their respective operational positions for use of the earth working implement as an integral unit in the performance of its earth working operation.

The turnbuckle assemblies 192 and 292 of the respective left positioning assembly 130 and right positioning assembly 230 are adjusted by the operator relatively to increase or decrease the relative lengths of the support arm assemblies 190 and 290 as may be preferred for the desired positioning and operation of the left and right subframes 31 and 33, respectively. Since the outer pin passages 195 and 295 are elongated slots, as previously described, the increase in the relative length of the support arm assemblies causes the interior edges of the outer pin passages 195 and 295 to engage the linking pins 178 and 278 to maintain a down force on the left and right subframes. Similarly, a decrease in the relative lengths of the support arm assemblies using the turnbuckle assemblies 192 and 292, respectively, causes the exterior edges of the outer pin passages 195 and 295 to engage the linking pins 178 and 278 to maintain a lifting force on the left and right subframes. In both cases, as permitted by the lengths of the slots of the outer pin passages 195 and 295, flexing of the left and right subframes 31 and 33 about their respective left pivot assembly 32 and right pivot assembly 34 is permitted as defined by the lengths of the slots of the outer pin passages 195 and 295.

This same flexing is permitted when the left and right subframes are in their respective elevated positions as shown in FIG. 1 due to the elongated slots of the inner pin passages 196 and 296. This is all within the control of the operator through use of the turnbuckle assemblies 192 and 292.

Still further, as can be visualized in FIG. 1, when the left subframe 31 and right subframe 33 are in their respective elevated positions, the edges 167 and 267 of the respective stop plates 166 and 266 operate to provide an absolute limit to pivotal movement of the left and right subframes beyond the elevated positions of rotation shown in FIG. 1. The edges engage the main frame 30 to prevent further pivotal movement. The turnbuckle assemblies 192 and 292 can be employed to tighten the left and/or right subframes in these fixed, inflexible positions, or can be loosened to provide some flexibility in these regards.

After completion of the earth working operation, the earth working implement 20 is returned to the configuration shown in FIG. 1 for transport and storage by a reversal of the steps heretofore described.

Therefore, the apparatus of the present invention is widely adaptable for usage in the multiplicity of operative environments; is capable of achieving all of the primary and secondary operational objectives required in a particular operative environment in positioning a work object relative to a primary support; is adaptable of use in very confined areas while achieving its operational objectives; is fully adaptable to a wide variety of operative environments without compromising the criteria selected therefor; has particular utility in very heavy machinery, such as agricultural implements, wherein tremendous weights and forces must be applied in achieving the primary operational objectives while retaining a full capability for reconfiguration for ease of transport and storage; and is otherwise fully successful in achieving its operational objectives.

Although the invention has been herein shown and described in what is conceived to be the most practical and preferred embodiment, it is recognized that departures may be made therefrom within the scope of the invention which is not to be limited to the illustrative details disclosed.

Having described my invention, what I claim as new and desire to secure by Letters Patent is:

1. An apparatus for positioning a work object relative to a primary support between first and second positions in movement substantially relative to a predetermined location, the apparatus comprising a first mounting means adapted to be mounted on said work object in spaced relation to said predetermined location; a second mounting means adapted to be mounted on said primary support; a linking assembly interconnecting said first and second mounting means; and means operatively connected to said linking assembly for selectively applying force between said work object and said linking assembly to move said linking assembly and thereby said work object between said first and second positions.

2. An apparatus for positioning a work object relative to a primary support between first and second positions in movement substantially relative to a predetermined axis, the apparatus comprising a first mounting means adapted to be mounted on said work object in spaced relation to said predetermined axis; a second mounting means adapted to be mounted on said primary support; a linking assembly interconnecting said first and second mounting means; and means connected to said linking assembly for selectively applying force thereto to move said linking assembly and thereby said work object between said first and second positions and wherein said force applying means operatively interconnects said work object and said linking assembly.

3. The apparatus of claim 2 wherein said force applying means is an hydraulic cylinder assembly which is selectively operable to be expanded and, alternatively, contracted to move said linking assembly and, thereby, said work object between said first and second positions.

4. The apparatus of claim 2 wherein said work object is mounted on said primary support for movement substantially about said predetermined axis which is a pivot axis and said force applying means operatively interconnects said linking assembly and the work object substantially between said pivot axis and the linking assembly.

5. The apparatus of claim 4 wherein the linking assembly includes a first linking arm substantially pivotally mounted on said primary support and a second linking arm substantially pivotally mounted on the work object and wherein the first and second linking arms are interconnected for substantially pivotal movement relative to each other.

6. The apparatus of claim 5 wherein said force applying means is an hydraulic cylinder selectively operable to expand substantially pivotally to move said second linking arm from said pivot axis and said first linking arm from said pivot axis to move the work object toward said second position.

7. The apparatus of claim 6 wherein said hydraulic cylinder is selectively operable to contract substantially pivotally to move said second linking arm toward said pivot axis and said first linking arm toward said pivot axis to move the work object toward said first position.

8. The apparatus of claim 7 including an auxiliary support assembly having a mounting assembly adapted to be mounted on the primary support or the work object, a securing assembly adapted to be mounted on the other of said primary support or the work object opposite to said mounting assembly and a second linking assembly substantially pivotally mounted on said mounting assembly and releasibly interconnectable with said securing assembly selectively to retain the work object in said first position or, alternatively, said second position.

9. The apparatus of claim 8 wherein said auxiliary support assembly includes means for selectively varying the relative length of the auxiliary support assembly for the purpose of more precisely adjusting either said first position or said second position.

10. The apparatus of claim 7 wherein the hydraulic cylinder is selectively operable to move the work object to any intermediate position between said first position and said second position.

11. The apparatus of claim 5 wherein said force applying means is an hydraulic cylinder selectively operable to contract substantially pivotally to move said second linking arm toward said pivot axis and said first linking arm toward said pivot axis to move the work object toward said first position.

12. An apparatus for positioning a work object relative to a primary support between first and second positions wherein said work object is mounted on said primary support for movement substantially about a pivot axis, the apparatus comprising a first mounting means adapted to be mounted on said work object; a second mounting means adapted to be mounted an said primary support; a linking assembly interconnecting said first and second mounting means and wherein the linking assembly includes a first linking arm substantially pivotally mounted on said primary support and a second linking arm substantially pivotally mounted on the work object and wherein the first and second linking arms are interconnected for substantially pivotal movement relative to each other; means connected to said linking assembly for selectively applying force thereto to move said linking assembly and thereby said work object between said first and second positions, said force applying means operatively interconnects said work object and said linking assembly substantially between said pivot axis and the linking assembly, said force applying means is an hydraulic cylinder selectively operable to expand substantially pivotally to move said second linking arm from said pivot axis and said first linking arm from said pivot axis to move the work object toward said second position, said hydraulic cylinder is selectively operable to contract substantially pivotally to move said second linking arm toward said pivot axis and said first linking arm toward said pivot axis to move the work object toward said first position; and an auxiliary support assembly having a mounting assembly adapted to be mounted on the primary support or the work object, a securing assembly adapted to be mounted on the other of said primary support or the work object opposite to said mounting assembly and a second linking assembly substantially pivotally mounted on said mounting assembly and releasibly interconnectable with said securing assembly selectively to retain the work object in said first position or, alternatively, said second position and wherein said auxiliary support assembly includes means for selectively varying the relative length of the auxiliary support assembly for the purpose of more precisely adjusting either said first position or said second position and wherein said securing assembly includes a pin having a predetermined width and received in a slot of greater length than said predetermined width of said pin and wherein said slot has a predetermined interior edge and a predetermined exterior edge whereby said auxiliary support assembly can be adjusted to increase or decrease the relative length thereof to apply relative downward force or upward force on the work object by respectively engaging said interior edge of the slot against the pin to apply downward force or alternatively said exterior edge of the slot with the pin to apply upward force.

13. The apparatus of claim 12 including a member borne by the work object to engage the primary support in said second position to provide an absolute limit to movement of the work object beyond said second position.

14. The apparatus of claim 13 wherein said slot and pin received therein define a limited range of movement of the work object in said first and second positions except as limited by the operation of said hydraulic cylinder and engagement of said member with the primary support.

15. The apparatus of claim 12 wherein said slot and pin received therein define a limited range of movement of the work object in said first and second positions except as limited by the operation of said hydraulic cylinder and engagement of a member with the primary support.

16. An apparatus for positioning a subframe of an agricultural implement relative to a main frame of the agricultural implement and in which the subframe is mounted on the mainframe for pivotal movement about a substantially horizontal pivot axis, the apparatus comprising:

A. a linkage assembly including a first link arm pivotally mounted on the main frame on a side of the horizontal pivot axis opposite the subframe, a second link arm pivotally mounted on the subframe on a side of the horizontal pivot axis opposite the main frame and spaced from said horizontal pivot axis and wherein the first and second link arms individually have distal end portions which are pivotally interconnected;

B. an hydraulic cylinder assembly mounted on the subframe including a proximal end portion of the cylinder assembly pivotally mounted on the subframe in proximity to said horizontal pivot axis and a distal end portion pivotally mounted on the second link arm between the position at which the second link arm is pivotally mounted on the subframe and the position at which the distal end portions of the first and second link arms are pivotally interconnected; and C. an hydraulic control system operably connected to said hydraulic cylinder assembly and selectively operable to pivot the second link arm between a first position, in which the subframe is laterally deployed relative to the main frame in an operational position for use, and a second position, in which the subframe is disposed in an elevated position for transport and storage of the agricultural implement.

17. The apparatus of claim 16 wherein said second link arm has an arcuate configuration with a concave side thereof facing the horizontal pivot axis.

18. The apparatus of claim 17 wherein said distal end portion of the hydraulic cylinder assembly is pivotally mounted on the second link arm less than one half the distance between the position at which the second link arm is pivotally mounted on the subframe and the distal end portion of the second link arm.

19. The apparatus of claim 18 wherein, when the second link arm is in said first position, the first link arm is in a first position extending from a position at which the first link arm is pivotally mounted on the main frame substantially laterally of the main frame and, when the second link arm is in said second position, the first link arm is pivoted upwardly from said first position of the first link arm substantially ninety degrees.

20. The apparatus of claim 16 including

D. an auxiliary support assembly having a mount mounted on the main frame on one side of said horizontal pivot axis, a securing assembly mounted on the subframe on the opposite side of said horizontal pivot axis, a linking assembly pivotally mounted on said mount on the main frame and having a distal portion thereof slidably received in said securing assembly and means for releasibly interlocking the distal portion of the linking assembly in the securing assembly when the subframe is in said operational position and, alternatively, when the subframe is in said elevated position.

21. An implement comprising a main frame; a pair of subframes mounted on opposite sides of the main frame for substantially pivotal movement about individual horizontal, substantially parallel pivot axes between operational positions laterally deployed relative to the main frame and positions elevated therefrom; a pair of positioning apparatuses individually mounted on the main frame and individually connected to said subframes adjacent to the respective pivot axes, each of said positioning apparatuses including a linking assembly having one end portion pivotally mounted on the main frame, an opposite end portion pivotally mounted on its respective subframe and an intermediate pivotal portion; and an hydraulic cylinder assembly individual to each positioning apparatus of said pair of positioning apparatuses mounted on its respective subframe adjacent to its respective pivot axis and connected to its respective linking assembly operable individually to move its respective subframe to and from its respective operational position.

* * * * *